Jan. 13, 1931.   H. M. PFLAGER   1,788,588

LOCOMOTIVE TRAILER TRUCK

Filed April 24, 1925

Inventor
Harry M. Pflager
By Cornwall, Bedell & Janus
Attys

Patented Jan. 13, 1931

1,788,588

UNITED STATES PATENT OFFICE

HARRY M. PFLAGER, OF ST. LOUIS, MISSOURI, ASSIGNOR, BY MESNE ASSIGNMENTS, TO GENERAL STEEL CASTINGS CORPORATION, OF GRANITE CITY, ILLINOIS, A CORPORATION OF DELAWARE

LOCOMOTIVE TRAILER TRUCK

Application filed April 24, 1925. Serial No. 25,537.

My invention relates to railway rolling stock and consists in an improved trailer truck adapted for use in locomotives.

The objects of my invention are to provide a four wheel trailer truck instead of the usual two wheel trailer truck and to distribute the load on the trailer truck frame to each of the axles of the trailer truck and to provide an equalizing system for distributing the load on the trailer truck to both of the trailer truck axles and to the main equalizing system of the locomotive. I desire to accomplish this result without shifting the points of application of the load to the trailer truck frame from the usual load supporting points located, respectively, at the front and rear of the trailer truck frame as is customary with two wheel trailer trucks heretofore in use.

The above-mentioned objects are obtained in the structure illustrated in the accompanying drawings, in which—

Figure 1:
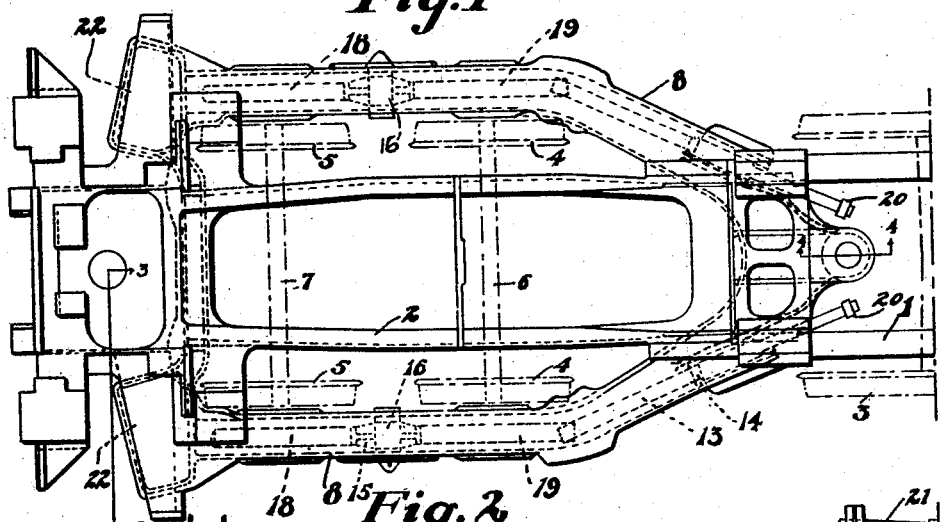
Figure 1 is a top view of the rear end of a locomotive frame, with cradle, supported upon a four wheel trailer truck.
Figure 2:
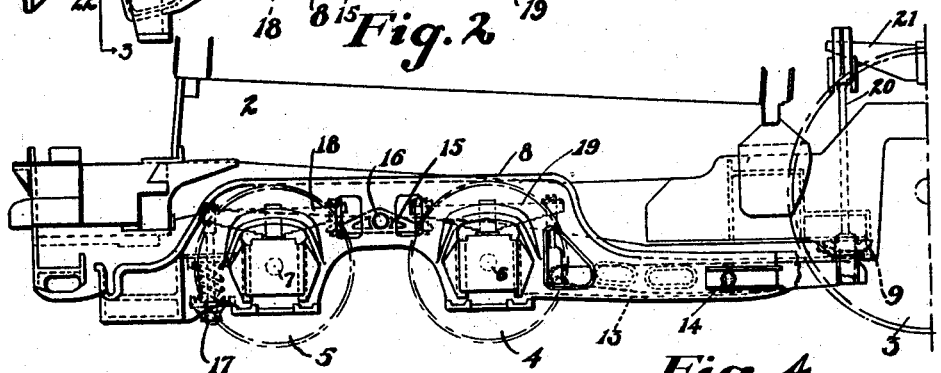
Figure 2 is a side elevation of the structure shown in Figure 1.
Figure 3:
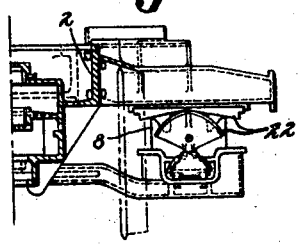
Figure 3 is a half rear elevation of the truck structure shown in Figures 1 and 2.
Figure 4:
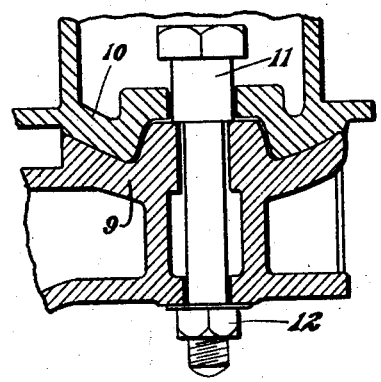
Figure 4 is a enlarged vertical longitudinal section through the point of connection of the trailer truck and locomotive frame and is taken substantially on line 4—4 of Figure 1.

In the drawings, the locomotive main frame is indicated at 1 and the cradle at 2. The rear locomotive driver is shown at 3 and the trailer truck wheels are indicated at 4 and 5 and their axles are shown at 6 and 7, respectively.

The trailer truck frame includes wheel pieces 8 which converge at their forward ends to form a center plate-like element 9, the upper portion of which fits into a complementary shaped lower portion of a member 10 on the locomotive frame. A king pin 11 passes through members 9 and 10 and is rigidly secured to member 9 by nut 12 and has limited longitudinal movement through member 10. This arrangement prevents accidental disassembly of members 9 and 10 but permits their disassembly when desired upon removal of nut 12.

The truck frame is supported by an equalizing system, the description of which will be simplified by referring to the elements located on one side only of the center line of the locomotive. These comprise an equalizer 13, pivoted to the truck frame at 14, an equalizer 15 pivoted to the truck frame at 16, and a hanger 17. Truck springs 18 and 19 resting upon the trailer journal boxes support hanger 17, equalizer 15, and the rear end of equalizer 13, as clearly shown in the drawing, and the forward end of equalizer 13 is carried by hanger 20 supported by the end of a spring 21 mounted on the journal box of the rear driver 1.

The portion of the locomotive load which is carried by the trailer truck is supported by the latter at its forward end through member 9 and at its rear end through bearings 22 located at the sides of the truck frame and consisting in any usual sliding or anti-friction bearings such as are in common use.

Preferably the trailer truck frame is formed of a single casting and the wheel pieces 8 are box-shape in cross section and receive and house the equalizers and springs. Obviously this preferred construction may be varied as may the details and the particular arrangement of the equalizing system without departing from the spirit of my invention. Irrespective of these features, the load applied to the trailer truck will be distributed to both trailer truck axles and to the locomotive drivers through the trailer truck equalizing system and the locomotive equalizing system, both systems being combined by the arrangement shown.

I claim:

1. In a locomotive, a trailer truck frame supporting superstructure load at its rear end, a driver axle, spaced trailer truck axles, and equalizers distributing the load on said truck frame to all of said axles.

2. In a locomotive, a trailer truck frame supporting superstructure load at its rear end, a driver axle, spaced trailer truck axles located between the ends of said truck frame, and equalizers distributing the load on said truck frame to all of said axles.

3. In a locomotive, a cradle, a trailer truck frame supporting said cradle, a driver axle, spaced trailer axles, and equalizers distributing the load on said truck frame to all of said axles.

4. In a locomotive, a cradle, a trailer truck frame, the opposite ends of which support said cradle, a driver axle, spaced trailer axles, and equalizers distributing the load on said truck frame to all of said axles.

5. In a locomotive, a cradle, a trailer truck frame beneath said cradle, the forward end of which frame partially supports said cradle, a driver axle, spaced trailer axles, and equalizers distributing the load on said truck frame to all of said axles.

6. In a locomotive, a cradle, a trailer truck frame, the opposite ends of which support said cradle, a driver axle, spaced trailer axles located between the ends of said truck frame, and equalizers distributing the load on said truck frame to all of said axles.

7. In a locomotive, a trailer truck frame, a driver axle, spaced trailer axles, and equalizers pivoted to said truck frame and distributing the load on said truck frame to all of said axles.

8. In a locomotive, a trailer truck frame, a driver axle, spaced trailer axles located between the ends of said truck frame, and equalizers pivoted to said truck frame and distributing the load on said truck frame to all of said axles.

9. In a locomotive, a cradle, a trailer truck frame, the forward end of which partially supports said cradle, a driver axle, spaced trailer axles, and equalizers pivoted to said truck frame and distributing the load on said truck frame to all of said axles.

10. In a locomotive, a cradle, a trailer truck frame, the opposite ends of which support said cradle, a driver axle, spaced trailer axles located between the ends of said truck frame, equalizers pivoted to said truck frame and distributing the load on said truck frame to all of said axles.

11. In a locomotive, a trailer truck frame supporting superstructure load at its rear end, a plurality of trailer truck axles, and equalizers supporting said frame from said axles and from the locomotive.

12. In a locomotive, a driver axle, a trailer truck frame, a plurality of trailer axles, and a system of equalizers, one end of which system is supported by said driver axle and the other end of which system supports a portion of said frame remote from said driver axle and the intermediate portion of which system is supported by said trailer axles.

13. In a locomotive, a driver axle, a trailer truck having spaced axles, a truck frame, an equalizer pivoted to said frame in front of said axles, an equalizer pivoted to said frame between said axles, yielding means supporting said frame from said truck axles, supporting both ends of said latter mentioned equalizer from said axles and supporting one end of said first-mentioned equalizer from one of said axles, and yielding means supporting the other end of said first-mentioned equalizer from said driver axle.

14. In a locomotive, a trailer truck frame, spaced trailer axles, an equalizer pivoted on said frame between said axles, a second equalizer pivoted on said frame in front of one of said axles, individual springs carried by said axles, connections between said springs and the ends of said first-mentioned equalizer, a connection between one of said springs and one end of the other equalizer, a connection between the other of said springs and said frame, and a support for the other end of said latter-mentioned equalizer.

15. In a locomotive, a trailer truck frame, equalizers pivoted on said frame at points spaced longitudinally thereof, an axle between said equalizers, a spring carried by said axle, respective connections between the ends of said spring and adjacent ends of said equalizers, and supporting means for the other ends of said equalizers.

16. In a locomotive, a trailer truck, a plurality of wheeled axles, a spring carried by each axle, an equalizer between said springs, an equalizer beyond said springs, a truck frame supported by said equalizers, and a support on the locomotive for said latter equalizer.

17. In a locomotive, a trailer truck, a plurality of wheeled axles, a spring carried by each axle, an equalizer between adjacent ends of said springs, an equalizer beyond said springs, a truck frame, and elements supporting said frame from said equalizers.

18. In a locomotive, a trailer truck, a truck frame, an equalizer pivoted on said frame, two wheeled axles, a spring carried by each axle, a connection between one end of each spring and an end of said equalizer, and an equalizer for supporting said frame pivoted on said frame beyond the end of one of said springs.

19. In a locomotive, a trailer truck including a truck frame and wheel carrying axles, means for supporting the truck frame upon said axles, which supporting means is located in front of and to the rear of said axles, the supporting means including a plurality of equalizers on each side of the truck that are fulcrumed on the trailer truck frame and form part of the main equalizing system of the locomotive, said truck frame being adapted to receive its load at a point near its forward end in front of the fulcrum points of the equalizers and at points to the rear of said axles.

20. In a locomotive, a trailer truck including a frame and wheel carrying axles, which frame is adapted to receive the weight and load of the locomotive at a single point near its forward end and at a plurality of points to the rear of said axles, and means yieldingly supporting the trailer truck frame upon its axles which include springs supported by the truck axles and equalizing members that are fulcrumed on the truck frame and which form a part of the main equalizing system.

21. In a locomotive, a trailer truck including a frame and a plurality of wheel carrying axles, which frame is adapted to receive the weight and load of the locomotive at a single point near its forward end and at a plurality of points to the rear of said axles, and means for yieldingly supporting the truck frame upon said axles, which means includes springs supported by said axles and equalizing members that are fulcrumed on the truck frame in front of the axles, the forward ends of said equalizing members being connected to the main equalizing system of the locomotive.

22. In combination with a locomotive, a trailer truck frame pivotally connected to said locomotive, a plurality of wheel carrying axles journaled by said truck frame, said truck frame being provided near its forward end and to the rear of said axles with bearings for the locomotive, springs supported by the truck axles, connections between the rear ends of said springs and the truck frame, equalizing members fulcrumed on the truck frame in front of said axles, and connections from the forward ends of the truck springs to the rear ends of said equalizing members, said equalizing members forming part of the main equalizing system.

23. An integral structure comprising a locomotive trailer truck frame having spaced pedestals on one side, an equalizer fulcrum between said pedestals, and an equalizer fulcrum adjacent the end of the frame.

24. In a locomotive, a trailer truck frame, a driver axle, a driver spring thereon, spaced trailer axles, springs thereon, an equalizer between said driver spring and one of said trailer springs, an equalizer between said trailer springs, an element anchoring the rear end of the rear of said trailer springs to said truck frame, and superstructure supported on said truck frame at the rear of said element.

25. In a locomotive, a trailer truck frame, a driver axle, a front trailer axle and a rear trailer axle, truck springs supporting said frame from said trailer axles, superstructure supported at its rear end by said frame at points located at the rear of all of said truck springs, and equalizers distributing the weight of the superstructure so supported to all of said axles.

26. In a locomotive, a trailer truck frame supporting superstructure load at its rear end, a driver axle, a spring supported by said driver axle, spaced trailer truck axles, springs supported by said truck axles, and equalizer supported by said truck axle springs, and an equalizer supported by one of the truck axle springs and by the driver axle springs.

27. In a locomotive, a trailer truck frame supporting superstructure load at its rear end, a driver axle, spaced trailer truck axles, an equalizer supported by said trailer truck axles and another equalizer one end of which is supported by one of the trailer truck axles, the other end of which is supported by the driver axle.

28. In a locomotive, a trailer truck having a plurality of axles, a trailer truck frame supporting superstructure load at its rear end, a driver axle, a spring supported by said driver axle, said spring being a part of the main equalizing system of said locomotive, the rear portion of said main equalizing system being supported by the trailer truck axles and being connected to the portion at drivers by an equalizer, one end of which is supported by the front truck-axle spring, the other end of which equalizer is supported by said driver-axle spring, said system having an equalizer pivoted to said truck frame at a point intermediate said truck axles.

In testimony whereof I hereunto affix my signature this 31st day of March, 1925.

H. M. PFLAGER.